United States Patent
Balasubramaniam Chandra

(10) Patent No.: US 8,095,683 B2
(45) Date of Patent: Jan. 10, 2012

(54) METHOD AND SYSTEM FOR MIRRORING DROPPED PACKETS

(75) Inventor: Sekar Balasubramaniam Chandra, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 850 days.

(21) Appl. No.: 11/365,352

(22) Filed: Mar. 1, 2006

(65) Prior Publication Data

US 2007/0208838 A1 Sep. 6, 2007

(51) Int. Cl.
*G06F 15/16* (2006.01)

(52) U.S. Cl. ........ 709/238; 709/224; 709/205; 709/232; 709/244; 709/200; 709/225; 709/226; 709/235; 709/229; 370/229; 370/423; 370/245; 370/401; 370/360

(58) Field of Classification Search ........... 709/238, 709/105, 232, 200, 224–244, 235, 229; 370/229, 370/423, 245, 401, 466, 230, 235, 360, 390
See application file for complete search history.

(56) References Cited

U.S. PATENT DOCUMENTS

| | | | | | |
|---|---|---|---|---|---|
| 6,041,042 | A * | 3/2000 | Bussiere | ............... | 370/245 |
| 6,263,368 | B1 * | 7/2001 | Martin | ............... | 709/224 |
| 6,546,423 | B1 * | 4/2003 | Dutta et al. | ............... | 709/225 |
| 6,680,906 | B1 * | 1/2004 | Nguyen | ............... | 370/229 |
| 6,826,148 | B1 * | 11/2004 | Lee | ............... | 370/230 |
| 7,031,304 | B1 * | 4/2006 | Arberg et al. | ............... | 370/360 |
| 7,209,476 | B1 * | 4/2007 | Colloff et al. | ............... | 370/360 |
| 7,721,299 | B2 * | 5/2010 | van Riel | ............... | 719/319 |
| 2001/0055274 | A1 * | 12/2001 | Hegge et al. | ............... | 370/229 |
| 2003/0112754 | A1 * | 6/2003 | Ramani et al. | ............... | 370/230 |
| 2003/0161306 | A1 * | 8/2003 | Hardy | ............... | 370/389 |
| 2003/0179761 | A1 * | 9/2003 | Dobbins et al. | ............... | 370/401 |
| 2004/0028047 | A1 * | 2/2004 | Hou et al. | ............... | 370/392 |
| 2004/0111461 | A1 * | 6/2004 | Claudatos et al. | ............... | 709/200 |
| 2004/0179477 | A1 * | 9/2004 | Lincoln et al. | ............... | 370/241 |
| 2004/0196841 | A1 * | 10/2004 | Tudor et al. | ............... | 370/389 |
| 2006/0114831 | A1 * | 6/2006 | Buduma et al. | ............... | 370/241 |
| 2006/0140130 | A1 * | 6/2006 | Kalkunte et al. | ............... | 370/241 |

OTHER PUBLICATIONS

"Installation and Basic Configuration Guide for the FastIron Edge Switch, FastIron Workgroup Switch X-Series, and FastIron Edge Switch X-Series", Foundry Networks, http://www.foundrynet.com/services/documentation/FES/FES_Global_Features.html, 60 pages.

* cited by examiner

*Primary Examiner* — Wing Chan
*Assistant Examiner* — Benjamin M Thieu
(74) *Attorney, Agent, or Firm* — Fish & Richardson P.C.

(57) ABSTRACT

A system for mirroring dropped packets by extending port mirroring. Networking devices, such as firewalls and routers drop some packets during data transmission due to various security issues, congestion and errors in the packets. The dropped packets are mirrored at a user-specified destination port by extending port mirroring. The mirrored packets can then be further analyzed by external traffic analyzers. The analysis can be helpful in finding out any mismatch between firewall rules and security policies at firewalls. Moreover, the analysis can also be helpful in finding out the extent of loss of useful data in dropped packets at forwarding devices such as routers, bridges, switches, firewalls etc.

18 Claims, 4 Drawing Sheets

METHOD AND SYSTEM FOR MIRRORING DROPPED PACKETS

BACKGROUND OF THE INVENTION

1. Field of Invention

Embodiments of the invention relate to data transmission over networks. More specifically, embodiments of the invention relate to methods and systems for mirroring dropped packets.

2. Description of the Background Art

In a network, data is transmitted from a source to a destination in the form of packets. During the transmission, some redundant data may get added to the original data in the form of viruses, worms or other unwanted malicious code. To detect such redundant data, network devices employ a firewall to screen the packets and to determine if the packets containing redundant data comply with security policies and firewall rules. Packets that do not meet the criteria of the firewall's rules are prevented from further transmission in the network and are considered "dropped" packets. However, dropping packets can result in the loss of necessary data if the Firewall rules are incorrectly configured. Some networking devices such as routers can have access control rules, which filter and drop packets similar to firewall rules. Hence incorrect configuration of access control rules can lead to loss of desired data.

In addition, packets can be dropped in transit at a networking device, such as a router, or other network infrastructure device, for example, due to network congestion. A congested network means that the traffic in a route is greater than the capacity of the router so some packets may be arbitrarily dropped.

According to conventional methods, an administrator of a firewall can explicitly log the dropped packets by configuring the firewall in such a way that the syslog messages about dropped packets are logged to a syslog server. Syslog technology is used to analyze the dropped packets at the firewalls. Syslog maintains a record of packets that the firewall rejects before they are actually dropped if administratively configured as mentioned above. This record might be used later for analyzing and receiving information about dropped packets. However, syslog does not facilitate the storage of the dropped packets for subsequent analysis.

DETAILED DESCRIPTION OF EMBODIMENTS OF THE INVENTION

Embodiments of the invention provide methods, systems, and computer-readable media for mirroring packets dropped during data transmission in a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
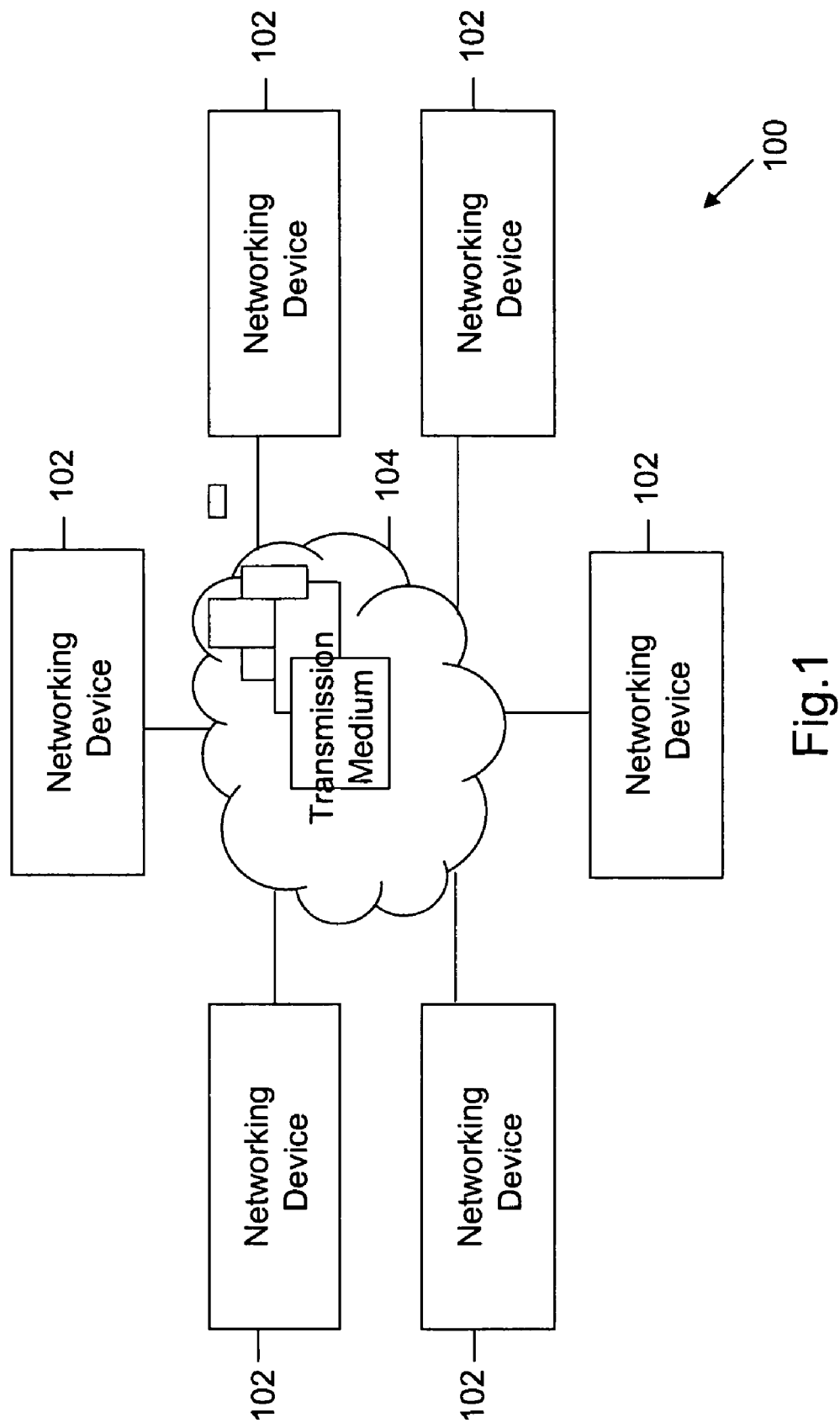
FIG. 1 illustrates a network that forms an environment to perform embodiments of the invention.

Referring now to drawings, more particularly by their reference numbers FIG. 1 shows system 100 that forms an environment to carry out embodiments of the invention. In an embodiment of the present invention, system 100 implements connectionless protocols such as User Datagram Protocol (UDP). System 100 includes networking devices 102 connected to each other. Examples of networking devices 102 include, but are not limited to gateways, routers, firewalls, repeaters, bridges, switches, etc. Networking devices 102 may be connected in various types of network topologies, such as ring, tree, star, bus, mesh, etc.

Figure 2:
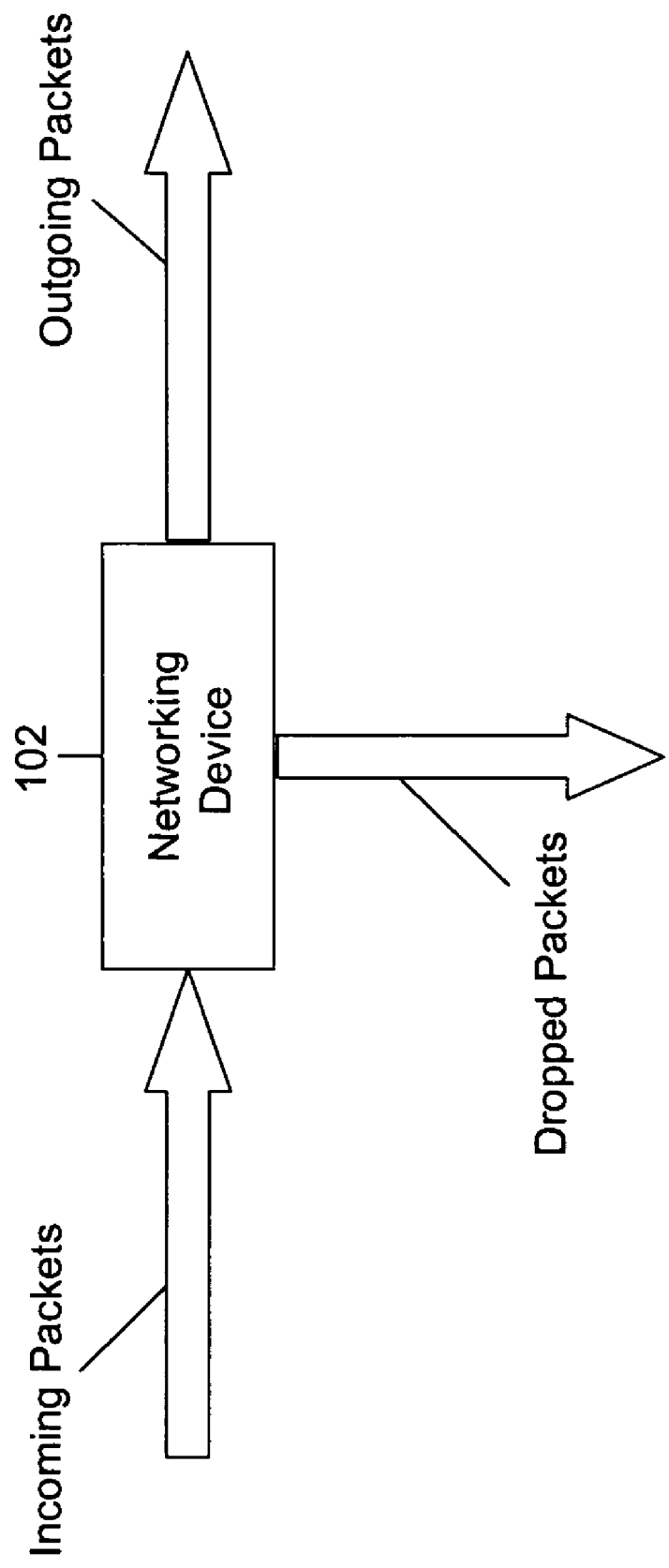
FIG. 2 illustrates transfer of data through a networking device in accordance with embodiments of the invention.

FIG. 2 illustrates the transfer of packets of data through a networking device from networking devices 102, in accordance with embodiments of the invention. The networking device transmits and receives data in the form of packets in network 104. The packets received by a networking device for transmission are hereinafter referred to as incoming packets. The packets that are transmitted by the networking device are hereinafter referred to as outgoing packets. During transmission, there is a possibility that the networking device drops some packets. The networking device may drop packets due to, for example, various security rules or issues, congestion factors or malfunctioning of the networking device. For example, based on security issues, packets that include viruses and redundant information may be dropped. The dropping of packets can sometimes result in the loss of a desired packet, which can result in reduced quality or loss of data.

Embodiments of the invention provide a method and a system to mirror the packets that the networking device drops during data transmission in network 104. The mirroring of the dropped packets includes forwarding a copy of the dropped packets at a port. In an embodiment of the invention, the copy of the dropped packets is forwarded at a user-specified destination port. The user-specified destination port is an interface present in networking device 102, which is configured to receive the dropped packets before the packets are actually dropped. The dropped packets are mirrored at the user-specified destination port by extending port mirroring. The mirrored packets can be further used for analysis by an external traffic analyzer connected to the user-specified destination port. The user-specified destination port is a port specified by the user. The user specifies that port as the user-specified destination port that is connected to the external traffic analyzer.

Figure 3:
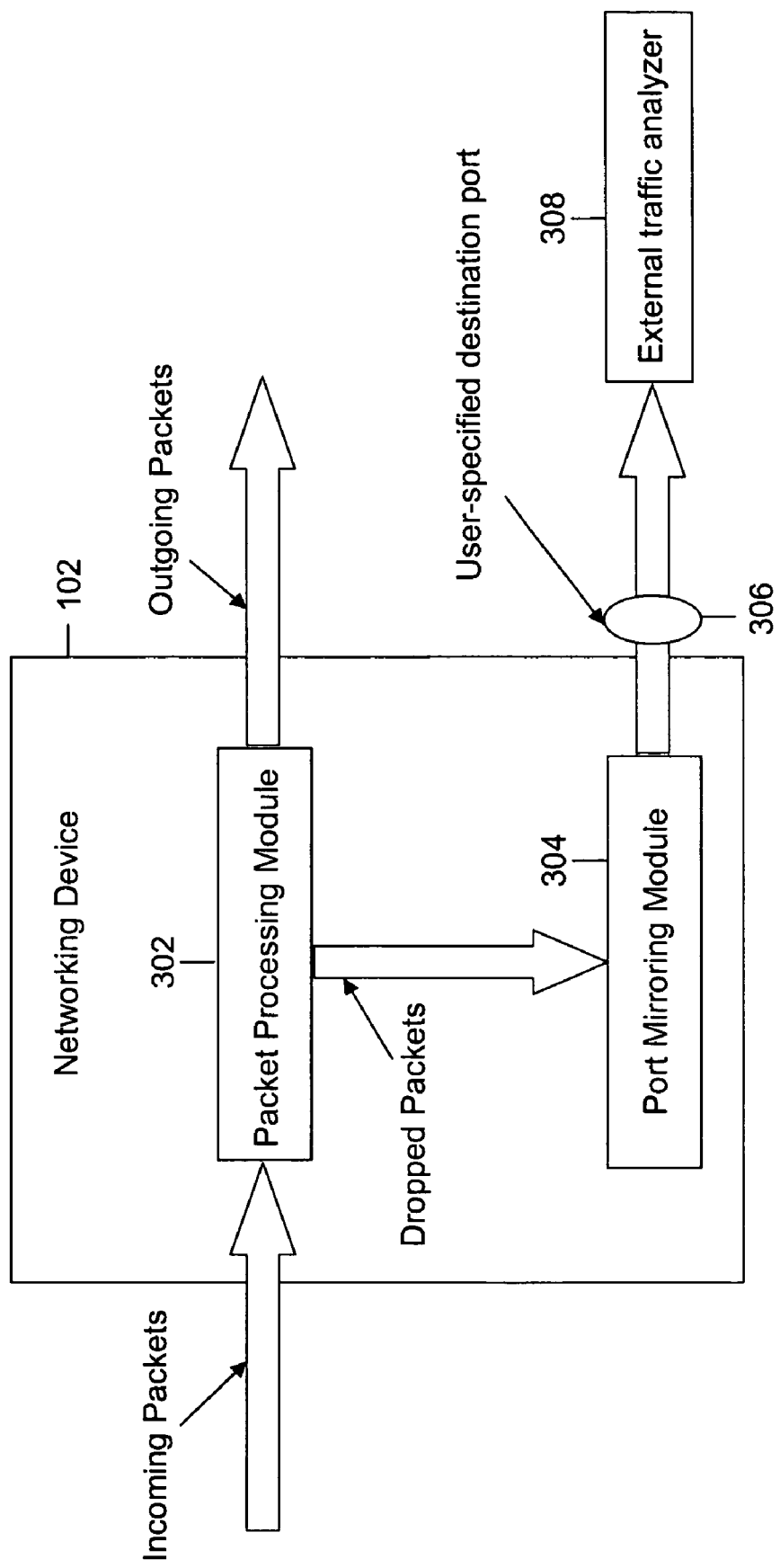
FIG. 3 illustrates various modules present in the networking device, in accordance with an embodiment of the invention.

FIG. 3 illustrates modules present in the networking device, in accordance with an embodiment of the invention. The networking device includes a packet processing module 302, a port mirroring module 304, a user-specified destination port 306 and an external traffic analyzer 308. Packet processing module 302 receives the incoming packets for transmission. Packet processing module 302 drops some incoming packets before transmitting the incoming packets. Port mirroring module 304 mirrors the dropped packets at user-specified destination port 306 by extending port mirroring. The mirrored packets at user-specified destination port 306 can be used for analysis by external traffic analyzer 308 connected to user-specified destination port 306.

Figure 4:
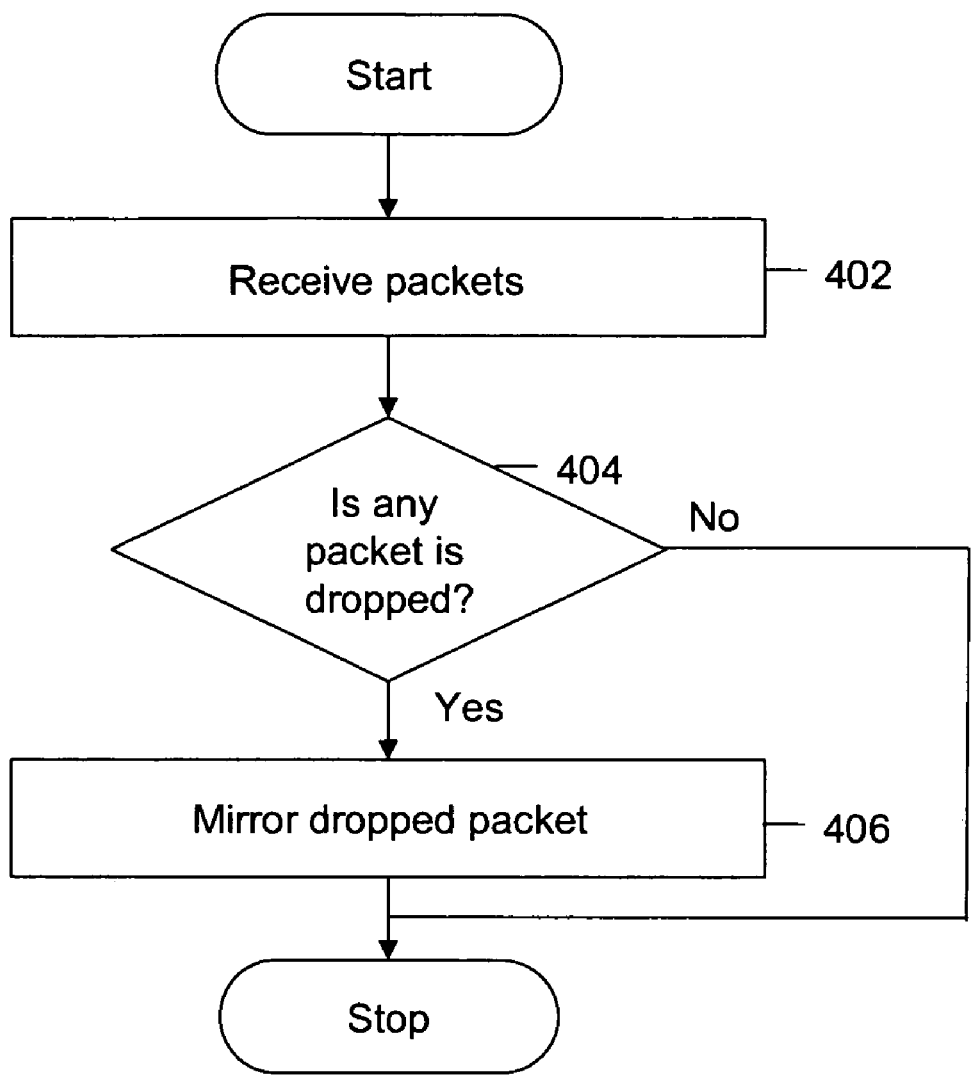
FIG. 4 is a flowchart illustrating a method for mirroring dropped packets, in accordance with embodiments of the invention.

FIG. 4 is a flowchart illustrating a method for mirroring the dropped packets during data transmission at the networking device, in accordance with embodiments of the invention. At step 402, packet processing module 304 of the networking device receives the incoming packets for transmission. As described earlier, packet processing module 302 may drop some packets while transmitting the received packets. If packet processing module 302 drops some packets at step 404, then, at step 406, port mirroring module 306 mirrors the dropped packets at user-specified destination port 306 by extended port mirroring.

In an embodiment of the invention, the networking device is a firewall.

The firewall is designed to prevent unauthorized access across network 104. As is understood in the art, the firewall may be implemented as hardware or software, or as a combination of hardware and software. Packets entering or leaving network 104 pass through the firewall and are examined. The firewall drops packets that do not meet the specified security criteria set by the network administrator of network 104. In this case, embodiments of the invention provide a method and a system to mirror the packets dropped at the firewall at user-specified destination port 306 by extended port mirroring. The mirrored packets can be forwarded to external traffic analyzer 308. In case of firewalls, the analysis can be useful in identifying problems in the firewall rules and security policies. The problems are identified in case there is a mismatch between firewall rules and security policies.

In an embodiment of the invention, the networking device is a forwarding device such as a router, a bridge, a repeater and a switch. The forwarding device may drop some packets during data transmission due to network congestion. Network 100 may get congested when the traffic of data in a route is greater than the capacity of the route. Therefore, to reduce the traffic, the forwarding device may drop some packets.

Embodiments of the invention provide a method and a system to mirror the packets dropped at the forwarding device at user-specified destination port 306 by extended port mirroring. The mirrored packets can be forwarded to external traffic analyzer 308. In case of the forwarding device, the analysis can be useful in determining the extent of loss of information due to the packets dropped at the forwarding device.

Embodiments of the invention facilitate the mirroring of the packets that a networking device drops. These packets are mirrored to user-specified destination port 306 by extending port mirroring.

Embodiments of the invention can be useful in identifying problems in the firewall rules and security policies. The problems are identified in case there is a mismatch between firewall rules and security policies. The analysis provided by the external traffic analyzer 308 can be useful in identifying the mismatch.

Embodiments of the invention can be useful in identifying the impact of packet loss by determining the extent of loss of information due to dropped packets at the forwarding device.

According to embodiments of the present invention, a method for mirroring dropped packets during data transmission in a network is provided. The method comprising receiving packets at a networking device, the packets are received for transmission to another networking device; dropping some of the received packets; and mirroring the dropped packets at a port by extending port mirroring.

In an embodiment of the present invention, a system for mirroring dropped packets during data transmission in a network is provided. The system comprising a packet processing module adapted to receive packets for transmitting to another networking device; a port mirroring module adapted to mirror the dropped packets at a user-specified destination port, the dropped packets are packets that the packet processing module drops while transmitting the received packets and a user-specified destination port to receive the mirrored dropped packets.

In another embodiment of the present invention, a system for mirroring dropped packets during data transmission in a network is provided. The system for mirroring dropped packets during data transmission in a network comprises means for receiving packets at a networking device, wherein the packets are received for transmission to another networking device; and means for mirroring packets that are dropped by the networking device, wherein the dropped packets are mirrored at a port of a networking device by extending port mirroring.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above."

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
    a first network device in a network, the first network device including:
        a destination port; and
        a packet processing hardware module that is configured to:
            receive, from a user, information associated with the destination port that is to be configured for processing packets that are to be dropped;
            configure the destination port for receiving packets that are to be dropped, wherein the destination port is configured to forward a copy of the packets to an external network analyzer in the network that is connected to the destination port;
            receive packets for transmitting to another network device;
            determine that one or more first packets included in the received packets are to be dropped;
            responsive to determining that one or more first packets are to be dropped, forward the one or more first packets to the destination port while transmitting a remainder of the received packets to the another network device;
            generate at the destination port a copy of each packet in the one or more first packets using extended port mirroring;
            forward, using the destination port, the copy of each packet to the external traffic analyzer, wherein the external traffic analyzer is configured for determining a reason for dropping the one or more first packets and determining an extent of a loss of information due to dropping the one or more first packets by examining the copy of each packet;

upon forwarding to the external traffic analyzer the copy each packet, drop the one or more-first packets;

receive, from the external network analyzer, information of an analysis regarding dropping the one or more first packets; and responsive to receiving the information of the analysis, identify a problem in firewall rules and security policies in the first network device, wherein the problem is a reason for dropping the one or more first packets, and wherein the problem is caused by a mismatch between the firewall rules and the security policies.

2. The system of claim 1, wherein the network device includes a firewall.

3. The system of claim 1, wherein the network is configured to implement connectionless protocols.

4. The system of claim 1, wherein mirroring is performed before dropping the packets at the network device.

5. The system of claim 1, wherein the packet processing hardware module is further configured to determine that the one or more first packets are to be dropped based on a security rule.

6. The system of claim 1, wherein the packet processing hardware module is further configured to determine that the one or more first packets are to be dropped based on network congestion or malfunctioning of the network device.

7. A system comprising:
a first network device in a network, the first network device including:
a destination port; and
a packet processing hardware module that is configured to:
receive, from a user, information associated with the destination port that is to be configured for processing packets that are to be dropped;
configure the destination port for receiving packets that are to be dropped, wherein the destination port is configured to forward a copy of the packets to an external network analyzer in the network that is connected to the destination port;
receive packets for transmitting to another network device;
determine that one or more first packets included in the received packets are to be dropped;
responsive to determining that one or more first packets are to be dropped, forward the one or more first packets to the destination port while transmitting a remainder of the received packets to the another network device;
generate at the destination port a copy of each packet in the one or more first packets using extended port mirroring;
forward, using the destination port, the copy of each packet to the external traffic analyzer, wherein the external traffic analyzer is configured for determining a reason for dropping the one or more first packets and determining an extent of a loss of information due to dropping the one or more first packets by examining the copy of each packet;

upon forwarding to the external traffic analyzer the copy each packet, drop the one or more first packets;

receive, from the external network analyzer, information of an analysis regarding dropping the one or more first packets; and responsive to receiving the information of the analysis, identify a congestion in the network, wherein the congestion is a reason for dropping the one or more first packets, and wherein the congestion is caused by data traffic in a route being greater than a capacity of the route.

8. The system of claim 7, wherein the network device includes a router.

9. The system of claim 7, wherein the network device includes a switch.

10. A method comprising:
receiving, from a user, information associated with a destination port included in a first network device that is to be configured for processing packets that are to be dropped;
configuring the destination port for receiving packets that are to be dropped, wherein the destination port is configured to forward a copy of the packets to an external network analyzer in the network that is connected to the destination port;
receiving packets for transmitting to another network device;
determining that one or more first packets included in the received packets are to be dropped;
responsive to determining that one or more first packets are to be dropped, forwarding the one or more first packets to the destination port while transmitting a remainder of the received packets to the another network device;
generating at the destination port a copy of each packet in the one or more first packets using extended port mirroring;
forwarding, using the destination port, the copy of each packet to an external traffic analyzer, wherein the external traffic analyzer is configured for determining a reason for dropping the one or more first packets and determining an extent of a loss of information due to dropping the one or more first packets by examining the copy of each packet;
upon forwarding to the external traffic analyzer the copy each packet, dropping the one or more first packets;
receiving, from the external network analyzer, information of an analysis regarding dropping the one or more first packets; and
responsive to receiving the information of the analysis, identifying a problem in firewall rules and security policies in the first network device, wherein the problem is a reason for dropping the one or more first packets, and wherein the problem is caused by a mismatch between the firewall rules and the security policies.

11. The method of claim 10, further comprising identifying, based on the analysis using the external traffic analyzer, whether there is a mismatch between the firewall rules and the security policies that resulted in the one or more first packets being dropped.

12. The method of claim 10, further comprising:
analyzing, using the external traffic analyzer, content in the copy of the one or more first packets that are received at the external traffic analyzer; and
based on the analysis of the content, determining an extent of loss of information due to dropping at the network device the one or more first packets.

13. The method of claim 10, wherein the extended port mirroring is performed before dropping the one or more first packets at the network device.

14. The method of claim 10, wherein determining that one or more first packets are to be dropped comprises determining that the one or more first packets are to be dropped based on a security rule.

15. The method of claim 10, wherein determining that one or more first packets are to be dropped comprises determining that the one or more first packets are to be dropped based on congestion or malfunctioning of the network device.

16. The method of claim 10, further comprising:
examining the received packets at a firewall; and
determining that one or more of the received packets are to be dropped based on a security criterion.

17. A network device comprising:
means for receiving, from a user, information associated with a destination port included in a first network device that is to be configured for processing packets that are to be dropped; and
a processor configured to execute a plurality of instructions encoded in a non-transitory medium to cause the processor to perform operations including:
configuring the destination port for receiving packets that are to be dropped, wherein the destination port is configured to forward a copy of the packets to an external network analyzer in the network that is connected to the destination port;
receiving packets for transmitting to another network device;
determining that one or more first packets included in the received packets are to be dropped;
responsive to determining that one or more first packets are to be dropped, forwarding the one or more first packets to the destination port while transmitting a remainder of the received packets to the another network device;
generating at the destination port a copy of each packet in the one or more first packets using extended port mirroring;
forwarding, using the destination port, the copy of each packet to the external traffic analyzer, wherein the external traffic analyzer is configured for determining a reason for dropping the one or more first packets and determining an extent of a loss of information due to dropping the one or more first packets by examining the copy of each packet;
upon forwarding to the external traffic analyzer the copy each packet, dropping the one or more first packets;
receiving, from the external network analyzer, information of an analysis regarding dropping the one or more first packets; and
responsive to receiving the information of the analysis, identifying a problem in firewall rules and security policies in the first network device, wherein the problem is a reason for dropping the one or more first packets, and wherein the problem is caused by a mismatch between the firewall rules and the security policies.

18. A network device comprising:
means for receiving, from a user, information associated with a destination port included in a first network device that is to be configured for processing packets that are to be dropped; and
a processor configured to execute a plurality of instructions encoded in a non-transitory medium to cause the processor to perform operations including:
configuring the destination port for receiving packets that are to be dropped, wherein the destination port is configured to forward a copy of the packets to an external network analyzer in the network that is connected to the destination port;
receiving packets for transmitting to another network device;
determining that one or more first packets included in the received packets are to be dropped;
responsive to determining that one or more first packets are to be dropped, forwarding the one or more first packets to the destination port while transmitting a remainder of the received packets to the another network device;
generating at the destination port a copy of each packet in the one or more first packets using extended port mirroring;
forwarding, using the destination port, the copy of each packet to the external traffic analyzer, wherein the external traffic analyzer is configured for determining a reason for dropping the one or more first packets and determining an extent of a loss of information due to dropping the one or more first packets by examining the copy of each packet;
upon forwarding to the external traffic analyzer the copy each packet, dropping the one or more first packets;
receiving, from the external network analyzer, information of an analysis regarding dropping the one or more first packets; and
responsive to receiving the information of the analysis, identifying a congestion in the network, wherein the congestion is a reason for dropping the one or more first packets, and wherein the congestion is caused by data traffic in a route being greater than a capacity of the route.

\* \* \* \* \*